(No Model.)
T. A. DAVIES.
RAILROAD RAIL JOINT.
No. 350,666. Patented Oct. 12, 1886.
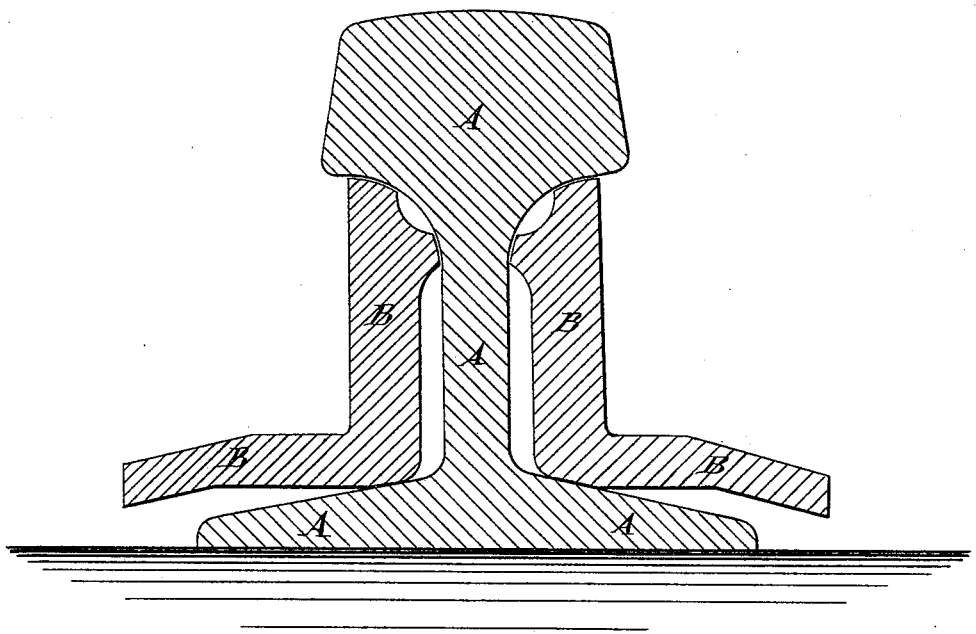
WITNESSES:
INVENTOR:
T. A. Davies
BY Munn &Co
ATTORNEYS.

UNITED STATES PATENT OFFICE.

THOMAS A. DAVIES, OF NEW YORK, N. Y.

RAILROAD-RAIL JOINT.

SPECIFICATION forming part of Letters Patent No. 350,666, dated October 12, 1886.

Application filed March 24, 1886. Serial No. 196,379. (No model.)

*To all whom it may concern:*

Be it known that I, THOMAS A. DAVIES, of the city, county, and State of New York, have invented a new and useful Improvement in Railroad-Rail Joints, of which the following is a full, clear, and exact description.

Reference is to be had to the accompanying drawing, forming a part of this specification, and which is a sectional elevation of a railroad-rail and a pair of fish-plates illustrating my improvement.

When the bearing-surfaces of a railroad-rail and its fish-plates are in straight lines, and a change of position in the fish-plates occurs from the forcing inward of the fish-plates by their springs or bolts and nuts consequent upon a wear of the said surfaces, the bearing comes upon points at the ends of the said bearing-surfaces, and the liability to wear is greatly increased.

The object of this invention is to provide railroad-rail joints constructed in such a manner that the amount of bearing-surfaces in contact will be unaffected by the setting up of the fish-plates.

The invention consists in the construction and combination of various parts of the railroad-rail joint, as will be hereinafter fully described.

A represents a railroad-rail, and B its fish-plates. The fish-plates B are so formed as to have a bearing upon the base of the flange of the rail, upon the under side of the head of the rail, and against the web of the rail. The two upper bearings may be continuous with each other, or may be made separate by recessing the inner sides of the upper edges of the fish-plates, as shown in the drawings. In either case the said two upper bearings are cylindrical surfaces, having their axis through the points where lines drawn through the lowest edge of the lower bearing and at right angles with the plane of the fish-plate intersect the outer surface of the said fish-plate.

The upper part of the curve of the bearing-surface of the rail must not extend beyond the point where a tangent to the circumference of the cylinder of which the said bearing-surface forms a part drawn through the said point will be at right angles with the plane of the rail, so that the said bearing-surface can be formed by the rolls that form the rails.

With this construction the upper bearing-surfaces of the fish-plates will always rest tightly against the corresponding bearing-surfaces of the rail, and will be unaffected by the inward movement of the fish-plate in taking up wear.

Having thus fully described my invention, what I claim as new, and desire to secure by Letters Patent, is—

In a railroad-rail joint, the combination, with the rail A, having its bearings for the upper parts of the fish-plates cylindrical surfaces, of the fish-plates B, having their upper bearings cylindrical surfaces, and their middle lower portions out of contact with the web of the rail, substantially as herein shown and described, whereby the contact of the bearing-surfaces of the said upper parts of the fish-plates with the corresponding bearing-surfaces of the rail will be unaffected by the movements of the said fish-plates in taking up wear, as set forth.

THOMAS A. DAVIES.

Witnesses:
JAMES T. GRAHAM,
C. SEDGWICK.